United States Patent
Papas et al.

(10) Patent No.: US 10,689,516 B2
(45) Date of Patent: Jun. 23, 2020

(54) POLYMER JACKET MATERIAL BLENDS WITH IMPROVED FLAME RESISTANCE

(71) Applicant: OTIS ELEVATOR COMPANY, Farmington, CT (US)

(72) Inventors: Paul Papas, West Hartford, CT (US); Georgios S. Zafiris, Glastonbury, CT (US); Brad Guilani, Woodstock Valley, CT (US)

(73) Assignee: Otis Elevator Company, Farmington, CT (US)

( * ) Notice: Subject to any disclaimer, the term of this patent is extended or adjusted under 35 U.S.C. 154(b) by 176 days.

(21) Appl. No.: 15/952,541

(22) Filed: Apr. 13, 2018

(65) Prior Publication Data
US 2018/0305549 A1 Oct. 25, 2018

Related U.S. Application Data

(60) Provisional application No. 62/487,688, filed on Apr. 20, 2017.

(51) Int. Cl.
| | |
|---|---|
| *C08L 85/02* | (2006.01) |
| *C08L 75/00* | (2006.01) |
| *B66B 7/06* | (2006.01) |
| *B66B 23/02* | (2006.01) |
| *C08L 83/04* | (2006.01) |
| *F16G 1/16* | (2006.01) |
| *F16G 9/04* | (2006.01) |
| *B29C 48/154* | (2019.01) |

(Continued)

(52) U.S. Cl.
CPC .............. *C08L 85/02* (2013.01); *B66B 7/062* (2013.01); *B66B 23/028* (2013.01); *C08L 75/00* (2013.01); *C08L 83/04* (2013.01); *F16G 1/16* (2013.01); *F16G 9/04* (2013.01); *B29C 48/154* (2019.02); *B29D 29/00* (2013.01); *B29K 2083/00* (2013.01); *B29K 2483/00* (2013.01); *B29K 2995/0016* (2013.01); *B29L 2029/00* (2013.01); *C08L 2201/02* (2013.01)

(58) Field of Classification Search
CPC .................................. C08L 85/02; C08L 83/04
See application file for complete search history.

(56) References Cited

U.S. PATENT DOCUMENTS

| | | | |
|---|---|---|---|
| 5,051,483 A * | 9/1991 | Rock ....................... | C08L 79/08 525/425 |
| 6,180,703 B1 * | 1/2001 | Onoi ....................... | C08K 5/54 524/265 |

(Continued)

FOREIGN PATENT DOCUMENTS

| | | | |
|---|---|---|---|
| EP | 2284111 | 4/2013 | |
| WO | WO-2015116509 A1 * | 8/2015 | .............. C08L 69/00 |

(Continued)

OTHER PUBLICATIONS

European Search Report for EP Application No. 18168622.1, dated Sep. 24, 2018.

*Primary Examiner* — Mark S Kaucher
(74) *Attorney, Agent, or Firm* — Carlson, Gaskey & Olds, P.C.

(57) ABSTRACT

A fire-resistant material according to an example of the present disclosure includes a base material and at least one of a siloxane polymer and a phosphonate polymer. A method of making a fire-resistant material is also disclosed.

20 Claims, 4 Drawing Sheets

(51) Int. Cl.
    *B29K 483/00*     (2006.01)
    *B29D 29/00*     (2006.01)
    *B29K 83/00*     (2006.01)
    *B29L 29/00*     (2006.01)

(56) References Cited

U.S. PATENT DOCUMENTS

| | | | |
|---|---|---|---|
| 6,739,433 B1 | 5/2004 | Baranda et al. | |
| 7,754,323 B2 | 7/2010 | Murai et al. | |
| 8,387,780 B2 | 10/2013 | Yu et al. | |
| 8,828,547 B2 | 9/2014 | Mundra et al. | |
| 9,249,295 B2 | 2/2016 | Nakayama et al. | |
| 9,555,579 B2 | 1/2017 | Krishnan et al. | |
| 2009/0220797 A1* | 9/2009 | Tresino | C08L 27/06 428/421 |
| 2011/0135926 A1 | 6/2011 | Yu et al. | |
| 2011/0259677 A1 | 10/2011 | Dudde et al. | |
| 2012/0264844 A1* | 10/2012 | Freitag | C08J 3/203 521/189 |
| 2012/0329591 A1 | 12/2012 | Goeser et al. | |
| 2014/0015168 A1* | 1/2014 | Krishnan | B29C 63/22 264/279 |
| 2014/0308505 A1* | 10/2014 | Schmitt | D01F 6/90 428/221 |
| 2015/0191331 A1* | 7/2015 | Orelup | D07B 1/22 428/76 |
| 2015/0291724 A1 | 10/2015 | Kusano et al. | |
| 2016/0325966 A1 | 11/2016 | Papas et al. | |

FOREIGN PATENT DOCUMENTS

| | | |
|---|---|---|
| WO | 2015134025 | 9/2015 |
| WO | 2016030298 | 3/2016 |

\* cited by examiner

POLYMER JACKET MATERIAL BLENDS WITH IMPROVED FLAME RESISTANCE

CROSS-REFERENCE TO RELATED APPLICATIONS

This application claims priority to U.S. Provisional Application No. 62/487,688 filed on Apr. 20, 2017.

BACKGROUND

There are various uses for elongated flexible assemblies such as for elevator load bearing members or roping arrangements, drive belts for machines such as a passenger conveyor and handrails for passenger conveyors, for example. Such assemblies may be designed with fire resistance performance in order to meet existing building codes or lower flammability related risks. Such assemblies must also meet mechanical performance requirements.

SUMMARY

A fire-resistant material according to an example of the present disclosure includes a base material and at least one of a siloxane polymer and a phosphonate polymer.

A belt according to an example of the present disclosure includes at least one tension member, and a jacket at least partially covering the at least one tension member. The jacket includes a fire-resistant material including a base material and at least one of a siloxane polymer and a phosphonate-based additive.

A method of making a fire-resistant article according to an example of the present disclosure includes combining a base material with at least one of a siloxane polymer and a phosphonate polymer in extrusion equipment, and extruding the combined base material, siloxane polymer, and/or phosphonate polymer to form a fire-resistant article.

Various features and advantages of at least one disclosed example embodiment will become apparent to those skilled in the art from the following detailed description. The drawings that accompany the detailed description can be briefly described as follows.

DETAILED DESCRIPTION

Figure 1:
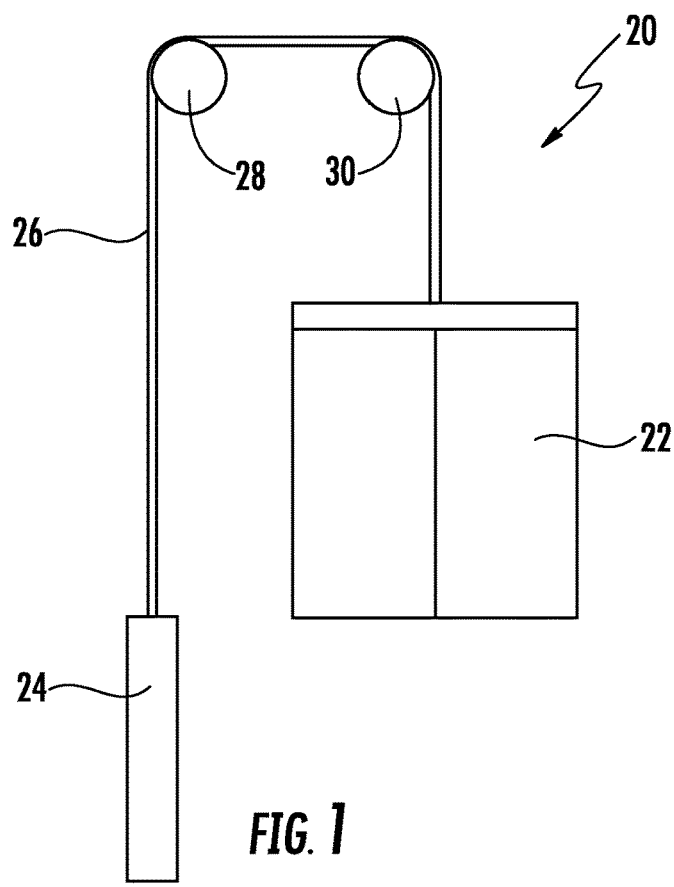
FIG. 1 schematically illustrates selected portions of an elevator system including a load bearing member designed according to an embodiment of this invention.

FIG. 1 schematically shows selected portions of an example elevator system 20. An elevator car 22 and counterweight 24 are suspended by a load bearing assembly 26. In one example, the load bearing assembly 26 comprises a plurality of flat belts. In another example, the load bearing assembly 26 comprises a plurality of round ropes.

The load bearing assembly 26 supports the weight of the elevator car 22 and the counterweight 24 and facilitates movement of the elevator car 22 into desired positions by moving along sheaves 28 and 30. One of the sheaves will be a traction sheave that is moved by an elevator machine in a known manner to cause the desired movement and placement of the elevator car 22. The other sheave in this example is an idler sheave.

Figure 2:
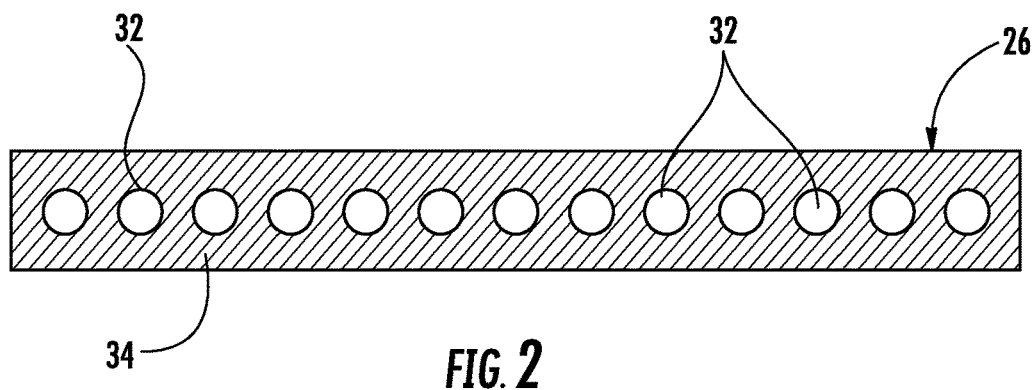
FIG. 2 is an end view schematically showing one example elevator load bearing member assembly.

FIG. 2 is an end view schematically showing one example flat belt configuration included as part of the example load bearing assembly 26. In this example, the flat belt includes a plurality of elongated cord tension members 32 and a polymer jacket 34 that contacts the tension members 32. In this example, the jacket 34 encases the tension members 32. In one example, the tension members 32 comprise wound metallic cords, such as steel. In another example, the tension members 32 comprise a polymer matrix composite including, for instance, fibers in a matrix material. Example fibers include but are not limited to carbon-, glass-, mineral-, liquid crystal-, and aramid-fibers. Example matrix materials include but are not limited to polyurethane, epoxy, bis-maleimide, phenolic, polyimide, polyester, and silicone matrix composites, or mixtures and blends thereof. The polymer jacket 34 in one example comprises a thermoplastic elastomer. In one example, the jacket 34 comprises a thermoplastic polyurethane. In another embodiment, the jacket 34 comprises a thermoplastic or thermosetting elastomer polymer (including polyurethane) or rubber polymer or mixtures and blends thereof.

Figure 3:
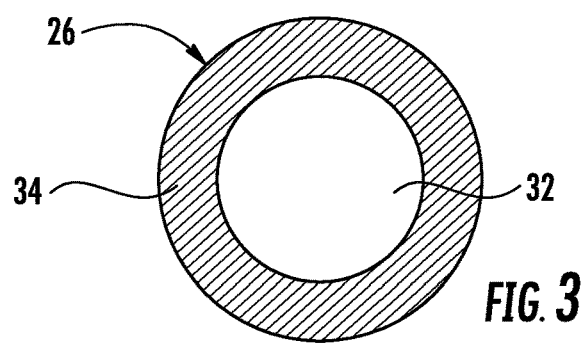
FIG. 3 is an end view schematically illustrating another example elevator load bearing assembly.

Another example is schematically shown in FIG. 3. An end view of a rope used as part of the load bearing assembly 26 includes at least one tension member 32 and a polymer jacket 34. In the example of FIG. 3, the same materials can be used as those mentioned above.

Figure 4:
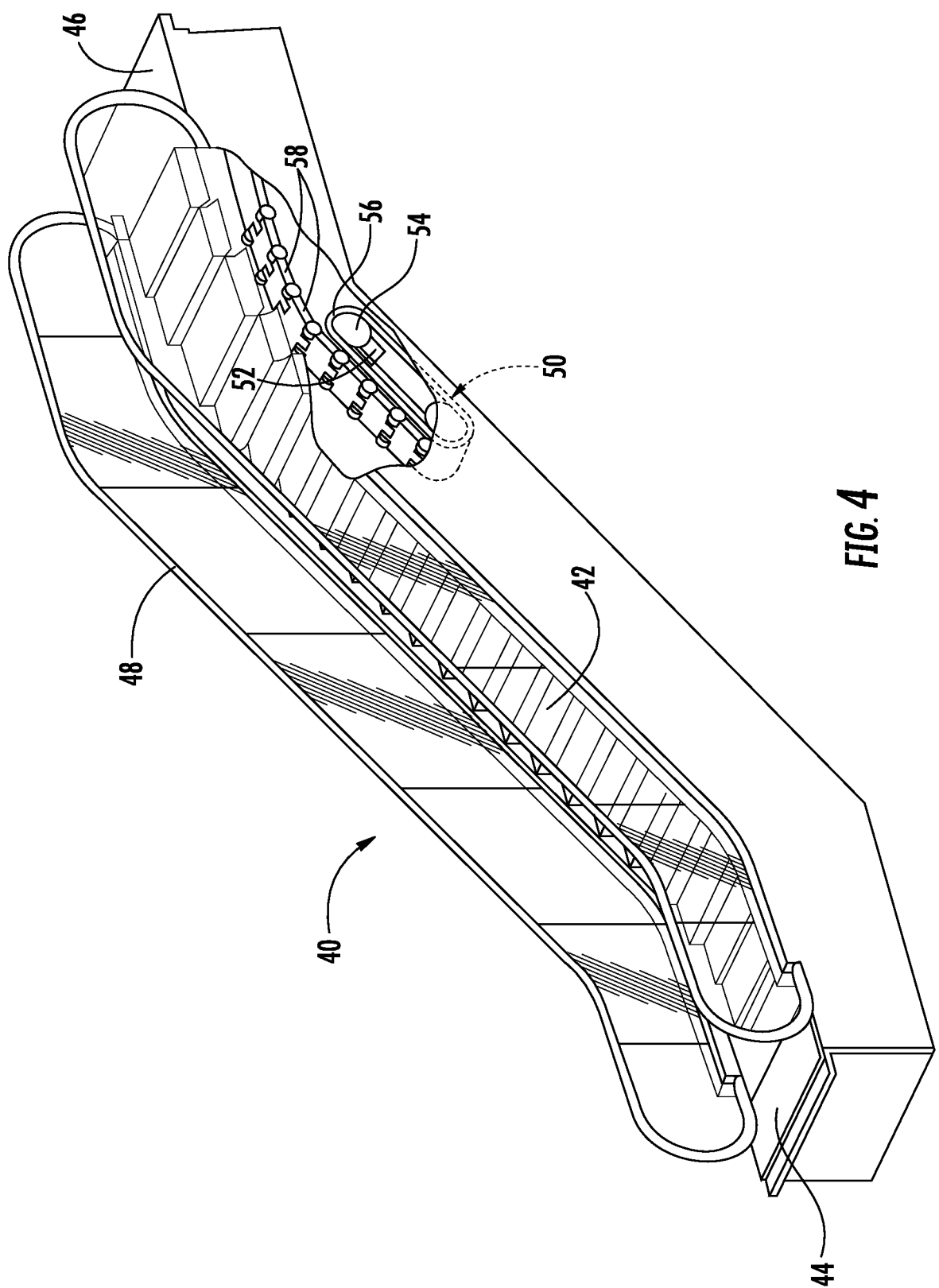
FIG. 4 diagrammatically illustrates a passenger conveyor including a drive belt and a handrail designed according to an embodiment of this invention.

FIG. 4 schematically illustrates an example passenger conveyor 40. In this example, a plurality of steps 42 move in a known manner to carry passengers between landings 44 and 46. A handrail 48 is provided for passengers to grab onto while traveling on the conveyor 40.

Figure 6:
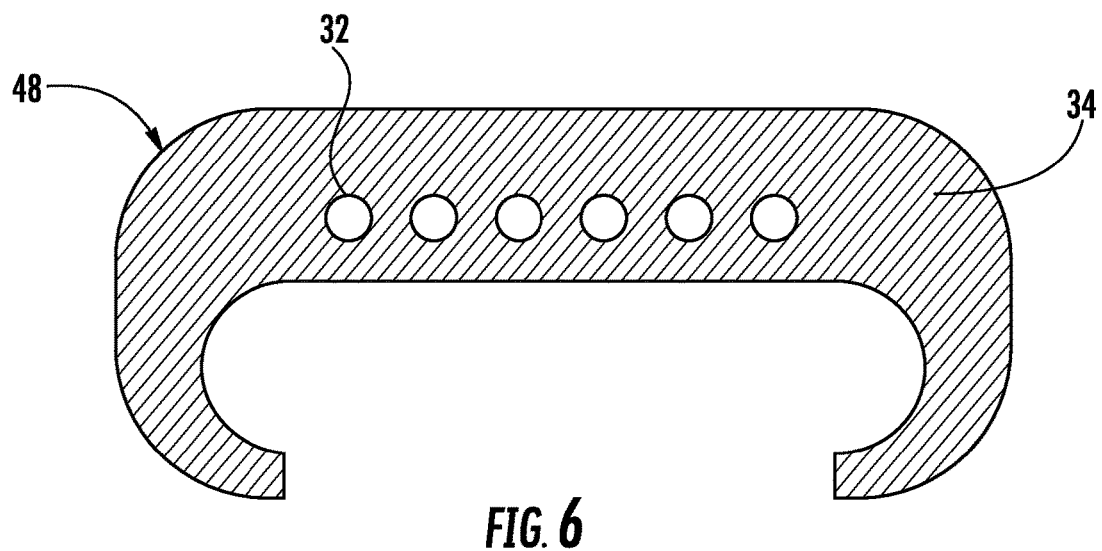
FIG. 6 schematically shows an example handrail configuration.

As shown in FIG. 6, the handrail 48 includes a plurality of tension members 32 such as steel cords or polymer matrix composite tension elements or members at least partially covered by a polymer jacket 34. The polymer jacket in this example establishes the gripping surface and the body of the handrail 48.

Figure 5:
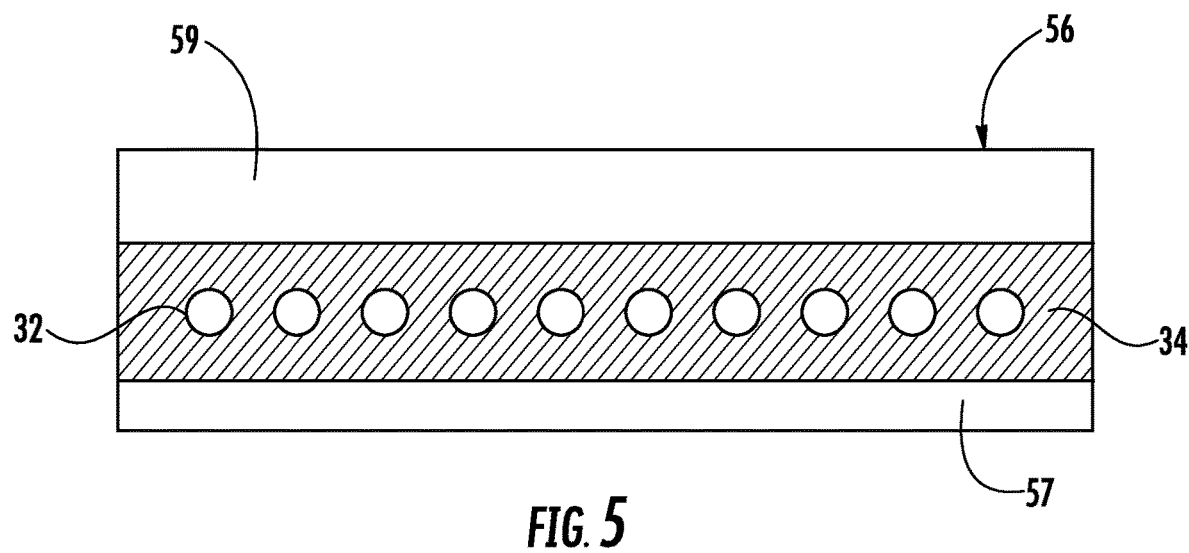
FIG. 5 schematically shows an example drive belt configuration.

The example of FIG. 4 also includes a drive arrangement 50 for propelling the steps 42 in a desired direction. A motor 52 rotates a drive sheave 54 to cause movement of a drive belt 56. As shown in FIG. 5, the example drive belt 56 has a plurality of elongated cord tension members 32 covered by a jacket 34. The jacket material establishes teeth 57 that interact with a corresponding surface on the drive sheave 54. A step chain 58 (FIG. 4) is engaged by teeth 59 on the drive belt 56 to cause the desired movement of the steps 42. In this example, the teeth 57 and 59 are on oppositely facing sides of the drive belt 56.

When a metal is used for the any of the example tension members 32, the metal material may be uncoated, coated, or plated with a protective metal. For example, a base ferrous metal may be coated or plated with zinc, tin or copper. In another embodiment, when a polymer matrix composite is used for the any of the example tension members 32, the polymer matrix composite material may be uncoated or coated or blended with an additive that promotes adhesion between said polymer matrix composite and the elastomer or rubber polymer jacket 34. The additive can include at least one of but not limited to poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer and blends thereof.

In each of the above example assemblies, the jacket material includes one or more additives promoting flame resistance. The jacket material in the illustrated embodiment includes a base material blended with at least one of a siloxane polymer and a phosphonate polymer or blends and mixtures thereof. The base material is one of a thermoplastic or thermosetting elastomer and rubber polymer. In one example, the jacket material is elastic. For instance, the base material can comprise an elastomer such as polyurethane.

Example phosphonate polymers include at least one of but are not limited to poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer and blends thereof. The phosphonate polymer is blended into the base material between about 0 and about 50% per weight. Example siloxane polymers include at least one of but are not limited to polyimide siloxane copolymers, polyetherimide siloxane copolymers, polyetherimide sulfone siloxane copolymers, polyimide polysiloxane block copolymers, polyetherimide polysiloxane block copolymers, polyetherimide sulfone polysiloxane block copolymers, and copolymers and blends thereof. The siloxane polymer is blended into the elastomer or rubber polymer core material between about 0 and about 100% per weight.

The combination of the siloxane polymer and the phosphonate-based polymer provides a flame retardant or fire resistant synergistic effect. For example, in case of fire, the combination of a siloxane polymer and a phosphonate-based polymer reduces burning or flame spread as well as molten dripping of the jacket material in a non-linear manner. Reducing molten dripping inhibits fire propagation and ignition of adjacent materials in the elevator hoistway or building structure surrounding a passenger conveyor. While addition of a siloxane polymer alone or a phosphonate polymer alone provides fire-resistance, the combination of them surprisingly also reduces dripping of the jacket material if exposed to fire or high heat conditions.

Furthermore, addition of siloxane polymers improve controlled slip and traction performance of the thermoplastic jacket material over time, eliminating the need for low molecular weight wax additives. Such wax additives may introduce variability in the performance of the material and ultimately high scrap rates and increased cost due to manufacturing variations. Eliminating or reducing such additives therefore enhances manufacturing yield and provides cost savings with increased performance and reliability.

The above phosphonate and siloxane polymers are free from halogens such that toxic gas is not a concern should the jacket material burn.

The siloxane polymer in some example embodiments comprises a siloxane polyetherimide block copolymer like Ultem™ Resin SILTEM-STM1500 or STM1700 or STM 1600 (manufactured by Saudi Basic Industries Corporation). The phosphonate polymer in some example embodiments comprises a polyphosphanate polymer or oligomer, such as Nofia® HM1100, OL5000, OL3000, OL3001, OL5001 (FRX Polymers, Inc.)

The siloxane and phosphonate polymers added to the jacket material are melt-extrudable and are melt-blended with the thermoplastic base of the jacket material. In some examples, the ideal melt processing temperature of the polymers in the jacket material are substantially similar to the ideal melt processing temperatures of the thermoplastic base material. In other examples the melt processing temperature of one of the above polymers may differ from the ideal melt processing temperature of the base material or the other polymer, and in this case it is added initially as a powder grind. In yet another example one or both of the polymers may be added to the base elastomer or rubber material in solution form in a common solvent, which is then evaporated upon processing to form the final solid belt or handrail article. In this latter case one or more the polymers and base materials can be in solution form in a common solvent.

In some embodiments, each of the additive polymers in the jacket material comprise less than about 50% of the total jacket material composition. More specifically, the jacket material can include both siloxane and phosphonate additive polymers, each comprising less than about 50% by weight of the total jacket material composition. Because a low amount of additive polymers is required to achieve the desired fire resistance characteristics, the mechanical properties of the thermoplastic jacket material (including abrasion resistance, tensile strength, and tear strength) are not significantly affected.

In one particular example, the jacket material 34 comprises a thermoplastic polyurethane, about 1-20% by weight of Nofia® HM1100 or OL5000 or OL3000, or OL3001, or OL5001 (FRX Polymers, Inc.), and about 1-20% by weight Ultem™ Resin SILTEM STM1500 or STM1600 or STM1700 (Saudi Basic Industries Corporation).

In a different example, the jacket material comprises an ether-based thermoplastic polyurethane, such as Elastollan® 1195 (BASF SE), and about 5-15% by weight of each of Nofia® HM1100 or OL5000 (FRX Polymers, Inc.) and Ultem™ Resin SILTEM STM1500 or STM1600 or STM1700 (Saudi Basic Industries Corporation). This example achieves a UL1581 FT1 fire resistance rating of the load bearing assembly 26.

In other embodiments, the jacket material is formed solely of the siloxane polymer, or a combination of the siloxane polymer and the phosphonate polymer, or a combination of elastomer or rubber base material and siloxane and phosphonate polymers discussed above.

Figure 7:
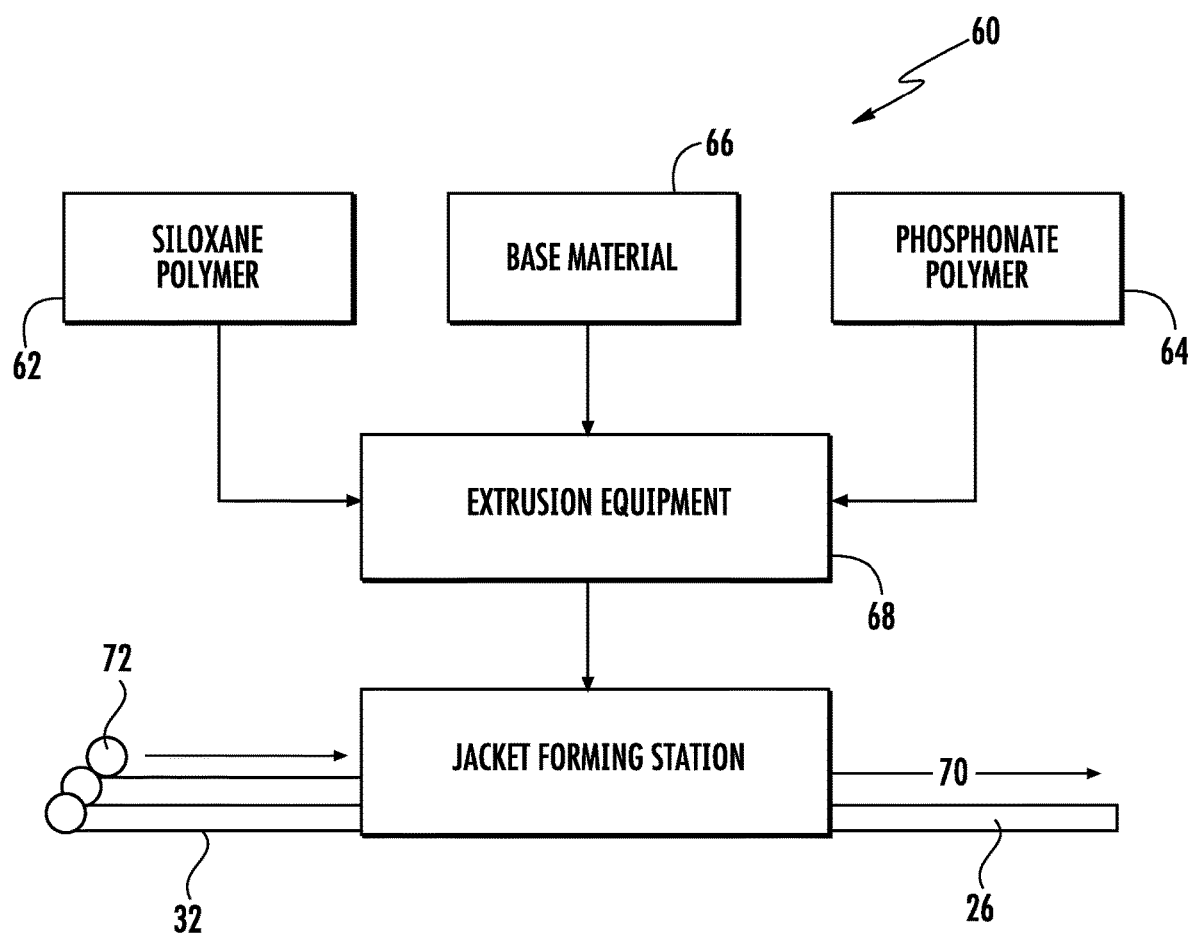
FIG. 7 schematically illustrates an example method of making an assembly designed according to an embodiment of this invention.

FIG. 7 schematically shows an example method 60 for making a fire-resistant article, such as a load-bearing belt or rope, a handrail, or a drive belt. A selected siloxane polymer material 62 such as those mentioned above, a selected phosphonate polymer material 64 such as those mentioned above, and a selected base material 66 such as the thermoplastic elastomer or rubber polymer base materials discussed above are provided to extrusion equipment 68. In one example, the siloxane polymer material 62 is in finely ground form prior to being provided to the extrusion equipment 68. In another example, the siloxane polymer material 62 is heated and provides a molten form of the siloxane polymer material to the extrusion equipment 68. In a third example, one or both of the polymers 62, 64 are provided to the extrusion equipment 68 while the thermoplastic base material is in molten form. In yet another example, the phosphonate polymer 64, the siloxane polymer 62, and the base material 66 are pre-compounded into a single material using single or twin-screw extrusion process and then fed directly to the jacket forming station 70.

The jacket material is formed into a desired shape as it exits the extrusion equipment 68 in a jacket forming station 70, or both. For instance, a plurality of spools 72 supply tension members 32 to the jacket forming station 70 and the jacket is extruded or molded onto at least one exterior surface of the tension members 32 resulting in the desired assembly. In the case of FIG. 7, the resulting assembly is an elevator load bearing belt 26.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fire-resistant material, comprising:
a base material, a siloxane polymer, and a phosphonate polymer, wherein the siloxane polymer comprises between about 1% and 20% by weight of the fire-resistant material and the phosphonate polymer comprises between about 1% and about 20% by weight of the fire-resistant material.

2. The fire-resistant material of claim 1, wherein the siloxane polymer comprises between about 5% and about 15% by weight of the fire-resistant material and the phosphonate polymer comprises between about 5% and about 15% by weight of the fire-resistant material.

3. The fire-resistant material of claim 1, wherein the siloxane polymer comprises at least one of a polyimide siloxane copolymer, polyetherimide siloxane copolymer, polyetherimide sulfone siloxane copolymer, polyimide polysiloxane block copolymers, polyetherimide polysiloxane block copolymers, polyetherimide sulfone polysiloxane block copolymer, and copolymers and blends thereof.

4. The fire-resistant material of claim 1, wherein the phosphonate polymer comprises at least one of poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer and blends thereof.

5. The fire-resistant material of claim 1, wherein the base material is elastic.

6. The fire-resistant material of claim 1, wherein the material is shaped into an elevator drive belt.

7. A belt, comprising:
at least one tension member; and
a jacket at least partially covering the at least one tension member, the jacket comprising a fire-resistant material including a base material, a siloxane polymer, and a phosphonate-based additive, wherein the siloxane polymer comprises between about 1% and about 20% by weight of the fire-resistant material and the phosphonate polymer comprises between about 1% and about 20% by weight of the fire-resistant material.

8. The belt of claim 7, wherein the tension members comprise wound metallic cords and a polymer matrix composite surrounding the wound metallic cords, the polymer matrix composite including fibers in a matrix material.

9. The belt of claim 8, wherein the fibers comprise at least one of carbon, glass, mineral, liquid crystal, and aramid fibers, and the matrix material comprises at least one of polyurethane, epoxy, bis-maleimide, phenolic, polyimide, polyester, and silicone matrix composites, or mixtures and blends thereof.

10. The belt of claim 7, wherein the siloxane polymer comprises at least one of polyimide siloxane copolymer, polyetherimide siloxane copolymer, polyetherimide sulfone siloxane copolymer, polyimide polysiloxane block copolymers, polyetherimide polysiloxane block copolymers, and polyetherimide sulfone polysiloxane block copolymer, and copolymers and blends thereof, and the phosphonate polymer comprises at least one of poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer and blends thereof.

11. The belt of claim 7, wherein the base material comprises at least one of a thermoplastic elastomer, a thermosetting elastomer, and a rubber polymer.

12. A method of making a fire-resistant article, comprising:
combining a base material with a siloxane polymer and a phosphonate polymer in extrusion equipment to form a mixture, wherein the siloxane polymer comprises between about 1% and about 20% by weight of the mixture and the phosphate polymer comprises between about 1% and about 20% by weight of the mixture; and
extruding the mixture to form a fire-resistant article.

13. The method of claim 12, wherein the fire-resistant article comprises a jacket for a belt.

14. The method of claim 13, further comprising the step of encasing at least one tension member in the jacket material.

15. The method of claim 12, comprising providing the siloxane polymer material to the extrusion equipment in a finely ground form.

16. The method of claim 15, comprising providing the siloxane polymer material to the extrusion equipment while the base material is in a molten form.

17. The fire-resistant material of claim 1, wherein the base material includes at least one of an elastomer and a rubber polymer.

18. The belt of claim 7, wherein the siloxane polymer comprises between about 5% and about 15% by weight of the fire-resistant material and the phosphonate polymer comprises between about 5% and about 15% by weight of the fire-resistant material.

19. The belt of claim 7, wherein the base material includes at least one of an elastomer and a rubber polymer.

20. The method of claim 12, wherein the siloxane polymer comprises between about 5% and about 15% by weight of the fire-resistant material and the phosphonate polymer comprises between about 5% and about 15% by weight of the fire-resistant material.

* * * * *